United States Patent
Holmquist et al.

(12)

(10) Patent No.: US 6,414,964 B1
(45) Date of Patent: Jul. 2, 2002

(54) METHOD AND APPARATUS FOR PERFORMING A MULTIPOINT POLLING PROTOCOL WHICH EMPLOYS SILENCE INTERVALS FOR CONTROLLING CIRCUIT OPERATION

(75) Inventors: Kurt E. Holmquist, Largo; William L. Betts, St. Petersburg, both of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 08/980,996

(22) Filed: Dec. 1, 1997

(51) Int. Cl.[7] ............................................. H04L 12/423

(52) U.S. Cl. .................................................. 370/449

(58) Field of Search ................................. 370/345, 346, 370/449, 450, 451, 452, 453, 454, 455, 456, 457, 459, 460; 340/825.06, 825.07, 825.08

(56) References Cited

U.S. PATENT DOCUMENTS

| | | | | |
|---|---|---|---|---|
| 5,355,501 A | * | 10/1994 | Gross et al. | 713/323 |
| 5,434,861 A | * | 7/1995 | Pritty et al. | 370/449 |
| 5,471,469 A | * | 11/1995 | Flammer, III et al. | 370/346 |
| 5,677,909 A | * | 10/1997 | Heide | 370/347 |
| 6,006,017 A | * | 12/1999 | Joshi et al. | 709/224 |

* cited by examiner

*Primary Examiner*—Kwang Bin Yao
(74) *Attorney, Agent, or Firm*—Thomas, Kayden, Horstemeyer & Risley LLP

(57) ABSTRACT

The present invention provides a method and apparatus for performing a multipoint polling protocol which employs silence intervals for controlling operation of the multipoint circuit. When a tributary station which has no data to send is polled by a control device, the tributary station does not send any signal in response to the poll. The control device measures the time which has lapsed since the last poll was sent and compares it to a "no-data" silent threshold timing interval. When the elapsed silent time exceeds the threshold interval, the control device assumes that the tributary has no data to send and immediately sends the next message. If the beginning of a non-silent response is detected before the threshold interval has passed, the control device receives the response and processes the response in the normal manner, e.g., in the manner in which typical multipoint polling protocols process responses. Before issuing a poll to a low-speed device, the control device allows a predetermined delay period of silence to elapse between the end of the last transmission on the line and the start of the poll transmission. This delay period is longer than the no-data threshold interval. All tributary stations measure this silent delay interval and, when it occurs, they prepare to receive a low-speed modulation transmission from the control device. When the period of silence does not exceed the predetermined silent delay interval, the low-speed devices know they will not be able to demodulate the received high-speed signal and, therefore, disable their receivers until energy is no longer detected on the line. When the tributary stations are connected to the subscriber line via a shared bus, the tributary stations determine whether a transmission is from another tributary station or from the control device based on a silent delay interval which occurs after the last transmission on the subscriber line.

30 Claims, 9 Drawing Sheets

METHOD AND APPARATUS FOR PERFORMING A MULTIPOINT POLLING PROTOCOL WHICH EMPLOYS SILENCE INTERVALS FOR CONTROLLING CIRCUIT OPERATION

TECHNICAL FIELD OF THE INVENTION

The present invention relates to a method and apparatus for performing a multipoint polling protocol and, more particularly, to a method and apparatus for performing a multipoint polling protocol which uses silence as a polling response and to control other aspects of circuit operation.

BACKGROUND OF THE INVENTION

Traditional polling protocols for multipoint circuits require that a polled tributary always respond with a message regardless of whether the data terminal equipment (DTE) associated with the polled tributary has any real data to send. A control device located at one end of the communication line manages the bandwidth on the subscriber line by polling each tributary. When a polled tributary fails to respond to a poll, the control device assumes that the poll message was corrupted.

Responding to polls is a function of the link layer. The link layer normally is implemented in the DTE, which is physically separated from the device which performs the modulation layer, i.e., the data communication equipment (DCE). Normally, the DCE does not interpret the contents of received messages and does not know the address assigned to the DCE. Therefore, the DCE relies entirely on the DTE to determine if and when to transmit a message to the control device. The standard handshake between DTE and DCE is such that there is no way for the DTE to tell the DCE before a poll arrives whether or not it has data for the DCE to send. Furthermore, there has not been a recognized standard or specification prescribing the maximum time delay between the time that the control device issues a poll and the time that the poll message was corrupted or that the DTE is otherwise unable to respond. In order to accommodate unknown processing delays in the DTE when responding to a poll, the silent time interval would have to be very large relative to the time needed to send a short non-silent message. Otherwise, a long processing delay in the DTE would be incorrectly interpreted as indicating that the DTE has no response. The accumulation of these delays when polling several drops would significantly degrade the response times seen by network users. All of these factors have made it impractical, if not impossible, to use silence as a valid response to indicate that the DTE has no data to send.

The use of silence as a poll response, if it could be utilized in a practical manner, would have several advantages over current multipoint polling protocols. As stated above, with typical multipoint protocols, a tributary is required to send a message in response to every poll. If the poll response is corrupted, the control device is obligated to poll again, even if the tributary actually had no data to send. A silence period is less likely to be corrupted and more likely to be correctly interpreted than is a no-response data message. Similarly, if any part of a message containing a poll is corrupted, the entire message must be disregarded. Interpreting a brief silence period as a no-data message allows the control device to quickly transmit again, thereby keeping the line busy and avoiding lengthy idle time-outs.

Another advantage of using silence as a no-data poll response is that it can minimize the amount of bandwidth required to be used for polling overhead. For example, a large number of terminal devices connected to the subscriber line that are not completely inactive but have low levels of activity can be efficiently polled by a single, group polling message. Since these low-activity devices typically do not have data to send, using silence as the poll response would allow all of these devices to respond correctly at the same time. In contrast, if the devices were required to respond with a non-silent message, only one device would be able to respond at a time. Therefore, using silence as a poll response could reduce the amount of line bandwidth required for polling tributaries which are unlikely to have data to send.

A further advantage of using silence as a polling response is that detecting the presence or absence of silence requires less processing time than to do all of the receiving functions of the physical and link layers of the line protocol. The functions of the DCE and/or DTE are typically executed on a programmable processor. In some implementations, this processor may be shared among several tasks in addition to those required just to support the DCE and/or DTE functions. When silence is used as a polling response, less of the available processing time of the shared processor is required to perform the DCE and/or DTE functions especially when "nothing to send" is the most frequent response, which is typically the case. It is possible to use some auxiliary hardware circuitry to detect the transition from silence to "data" so that the shared processor is only required to do the demodulation functions when something other than "nothing to send" is received in response to a poll.

The use of silence in a multipoint circuit can be extended to control other aspects of circuit operation. This makes use of the advantage that the length of silence can be easily measured and the measured length can provide useful information to the receiving station. In some cases it is convenient to use a shared bus circuit to provide the connection between the stations on the multipoint line. Examples of such a circuit are a telephone subscriber line or the wiring used in some types of local area networks (e.g., Ethernet). In these types of circuits, only one tributary station transmits on the shared line at a time and all connected tributary stations receive the signal transmitted from any of the other connected stations. While the tributary stations can receive signals from each other, they may not be able to demodulate these signals and typically the tributaries communicate only with the control station and not directly with each other. In this case, it is necessary for the tributaries to be able to determine whether or not the next transmission is from the control station rather than from another tributary station without being able to demodulate messages from other tributaries. If the transmission is from the control station, the DCE and DTE functions must be performed for the currently received message. If the transmission is from another tributary station, the signal can be disregarded, thereby making the processor available for other functions. As will be shown below in the discussion of the present invention, measuring the length of the silence time provides a convenient way for the tributary stations to make this distinction.

Yet another advantage of using silence to control circuit operations in a multipoint communications system is that it can be used to indicate the type of modulation that will be used next on the line. In some multipoint communications systems there may be a benefit to using more than one type of modulation. For example, a modulation capable of transmitting very high data rates may be used by stations requiring these rates. However, other stations which do not require high data rates may use a lower speed modulation which can be more economically implemented. These stations would, of course, not be able to use the high speed modulation. In accordance with the present invention, it has been determined that when the multipoint circuit is provided by a shared bus, silence can be used to indicate the type of modulation that will be used on the line next. The control station, which is capable of using either type of modulation, can indicate, via the length of the silence interval between the last and the next transmission, which of the two types of modulation it will be using in the next transmission.

SUMMARY OF THE INVENTION

In accordance with the present invention, a method and apparatus is provided for performing a multipoint polling protocol which uses silence for controlling circuit operation. In accordance with the present invention, when a tributary station which has no data to send is polled by a control station, the tributary station does not send any signal in response to the poll. The control station measures the time which has lapsed since the last poll was sent and compares it to a "no-data" silent threshold timing interval. When the elapsed silent time exceeds the threshold interval, the control station assumes that the tributary station has no data to send and immediately sends the next message, which may be a polling message or any other message. If the beginning of a non-silent response is detected before the threshold interval has passed, the control station receives the response and processes the response in the normal manner, e.g., in the manner in which typical multipoint polling protocols process responses.

The present invention can be beneficially used when the tributary stations on a multipoint circuit are connected by a shared bus. In this situation, the tributary stations communicate only with the control station and not with each other, although they receive signals from all other tributary stations. In accordance with the present invention, the tributary stations recognize whether either the control station or another tributary station will transmit next by measuring the silence interval between the end of the last transmission, which could be from any station, and the beginning of the next transmission, which could be from any station.

As discussed above, in accordance with the present invention, it is valid for a tributary station to respond to a poll from the control station with silence. Therefore, the pattern of transmissions on the line can be any number of sequential transmissions by the control station (all separated by brief periods of silence) followed by at most one transmission from a tributary station. Prior to transmitting, the control station is silent for a time which is longer than the silence time used by tributary stations to indicate no response. If a tributary station is going to respond to a poll, its transmission must always begin before the expiration of the no-response silence interval following the end of the poll transmitted by the control station. Therefore, transmissions from tributary stations always begin within a shorter time following the end of the last transmission than do transmissions from the control station. The pre-transmission silence time used by the control station can be longer than the tributary no-response time by an amount which is easily recognized but which is not so great as to waste a significant amount of the available link bandwidth. Tributary stations determine whether or not the next transmission is from the control station simply by measuring the silence time between signals on the line.

This embodiment of the present invention allows the tributary station to correctly receive transmissions from the control station while disregarding transmissions from other tributary stations. It prevents using processing time at a tributary station for the physical and data link layer functions for messages which are not addressed to that station. Significantly, this embodiment also prevents adaptive functions in a tributary's receiver (such as adaptive gain control, adaptive equalization and recovery of signal timing information) from incorrectly attempting to adapt to the signal transmitted by another tributary station. Through the use of this embodiment of the present invention, a tributary station determines the source of a transmission without having to demodulate the message. In the absence of this feature, a tributary station receiver would have to be much more complicated because it would have to adapt to transmissions from all other tributary stations in addition to those from the control station.

When the tributary stations on a multipoint circuit are connected to a shared bus, the present invention may be utilized to allow both low-speed and high-speed modulations to be used on the same line. Many low-speed devices, such as those commonly referred to as "Internet appliances", have low data rate requirements. These may be devices such as, for example, security monitoring devices, energy control devices, etc. These types of devices typically have very little data to send and do not have fast response requirements. Ideally, the modulation used by these devices is designed to operate at low speeds in order to use the most cost-effective hardware.

In accordance with another aspect of the present invention, before issuing a poll to a low-speed device, the control station allows a predetermined delay period of silence to elapse between the end of the last transmission on the line and the start of the poll transmission. This delay period is longer than the no-data threshold interval. It is also longer than the silence interval normally imposed by the control station prior to transmitting using the high-speed modulation. As discussed above, all tributary stations measure this silent delay interval. When this silent delay interval exceeds the high-speed modulation silent delay interval threshold, all tributary stations prepare to receive a low-speed modulation transmission from the control station. When the period of silence does not exceed the predetermined silent delay interval, the low-speed devices know they will not be able to demodulate the received high-speed signal and, therefore, disable their receivers until energy is no longer detected on the line. Likewise, when the period of silence indicates that the low speed modulation will be used, the high-speed tributary stations disregard the received signal until the next silence interval is detected.

DETAILED DESCRIPTION OF THE INVENTION

Figure 1:
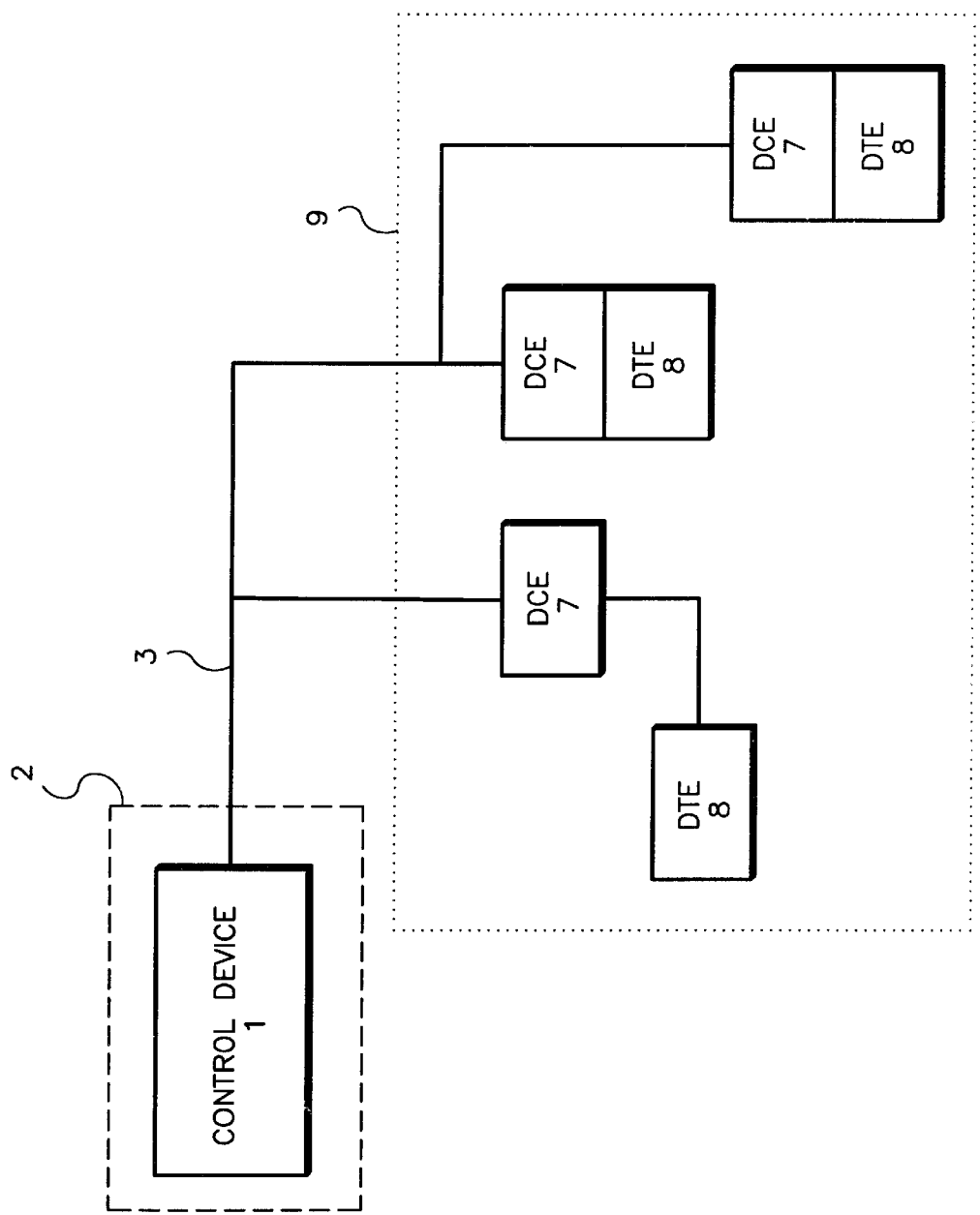
FIG. 1. is a block diagram functionally illustrating the connection between a bandwidth-management control device of a telephone service central office and several tributary stations via a PSTN subscriber line or similar circuit.

FIG. 1 is a block diagram which functionally illustrates a commonly used multipoint communication circuit. FIG. 1 shows the connection between a bandwidth-management control device 1 of a facility 2 located at one end of the communication line 3, and data communication equipment 7 (DCE) and data terminal equipment (DTE) 8 located at the other end of the line 3 at another location 9. The control device 1 may be located at, for example, a central office of a telephone network with DCEs 7 and the DTEs 8 being located at a subscriber's premises. In this case, all of these devices 1 and 7 may be connected directly to the telephone system subscriber line, which would correspond to line 3 in FIG. 1 in this case. Multiple DCEs 7 may be directly connected to line 3, either within or externally to the location 9, which may be the subscriber's premises.

The DTEs 8 may be computers or any other type of terminal devices, including, for example, high-speed and low-speed devices. For the purposes of discussion, the DCEs 7 are sometimes referred to generally as modems. It should be noted that the DCEs 7 may be any type of data communication equipment, including, but not limited to, DSL modems and dial-up modems. It will be apparent to those skilled in the art that the present invention is not limited with respect to the type of hardware and/or software comprised by the DCEs 7 and DTEs 8. The combination of such a DTE and DCE device is referred to in the following discussions as a "tributary device" or "tributary station".

In accordance with the preferred embodiment of the present invention, a tight communication coupling exists between the DTEs 8 and the DCEs 7 such that the timing interval between the time that a polling message is received by a DCEs 7 and the time that a poll response is issued by its respective DTE 8 to the DCE 7 (which is silence when the DTE 8 has no data to send) is very short. In other words, when a DTE 8 has actual data for its respective DCE 7 to output onto the line 5, the DCE 7 begins outputting the data very quickly after receiving the polling message. Likewise, even if the DTE 8 has data to send but, for any reason, is unable to respond to a poll within this short interval (perhaps because it has higher priority tasks to perform), the DTE 8 does not send any response to this poll. Therefore, the timing interval required for a silent no-data response to a poll can be made only slightly greater than the timing interval required for the DCE 7 to begin outputting data onto the line 3 after receiving a poll, while also minimizing the duration of the timing interval for a silent no-data response. This allows the duration of the silent no-data interval to be shorter than the amount of time which would be required to send a non-silent poll response message.

This tight communication coupling between the DTE 8 and the DCE 7 can be obtained in any number of ways. For example, one way of accomplishing this is to ensure that the DTE 8 responds immediately when the DCE 7 receives a poll from control device 1, as opposed to allowing the DTE 8 to process other tasks before responding to the poll. This may be accomplished by, for example, programming the DTE processor so that it assigns a higher priority to the task of responding to polling messages than it assigns to other tasks.

Another way of obtaining this tight coupling advantage is to allow the processing of the link layer and the modulation layer to be accomplished by the same processor, or by allowing some portion of the link layer processing and the modulation layer processing to be accomplished by the same processor. This may be accomplished by off-loading some of the modulation layer processing onto the link layer processor or, alternatively, by off-loading some of the link layer processing onto the modulation layer processor. In this way, the link layer receives the poll from the control device 1 at essentially the same time that the modulation layer receives the poll. Therefore, the link layer is capable of responding extremely quickly to the poll. The result is that the time delay between the receipt of a poll and the decision to turn on carrier is effectively zero, i.e., less than one symbol period. Silence on the line is measured extremely accurately by the modulation layer, which looks at the equalized signal. At the control device 1, the time delay between the expiration of the silent no-data interval and the earliest possible beginning of transmission of the next message by the control device 1 is also essentially zero. The overall benefit obtained from this tight coupling is that the overhead involved in transferring usage of the subscriber line from one tributary station to another is minimized.

Figure 2:
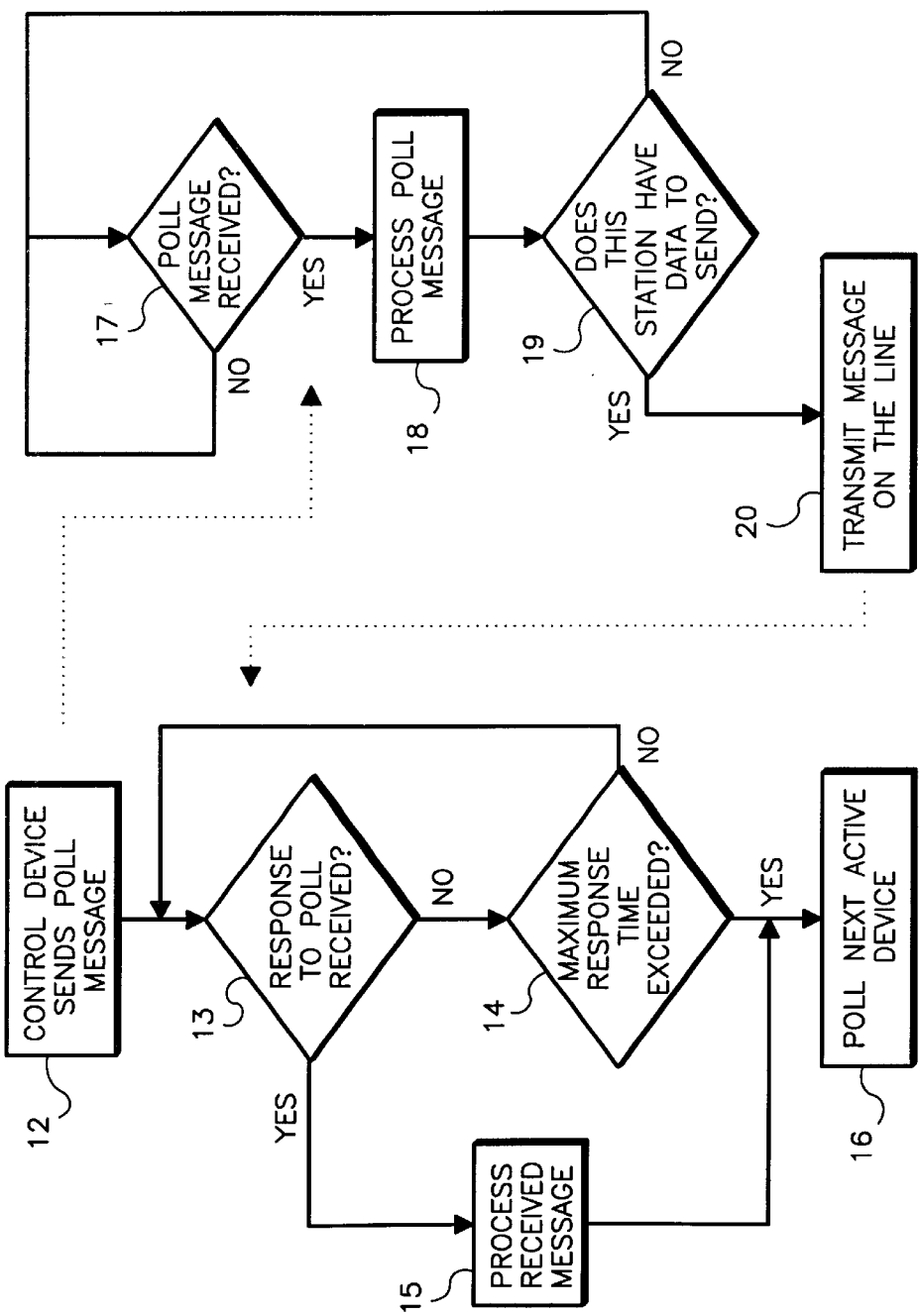
FIGS. 2A and 2B are flow charts illustrating the multipoint polling protocol of the present invention wherein a silence interval is used as the poll response by the tributary stations shown in FIG. 1 for signaling to the control device shown in FIG. 1 that there is no data to send.

FIGS. 2A and 2B are flow charts functionally illustrating the multipoint polling protocol of the present invention. When the bandwidth-management control device 1 located at the central office 2 sends a polling message to one of the DCEs 7, as indicated by block 12 in FIG. 2A, the intended DCE 7 receives the polling message, as indicated by block 17 in FIG. 2B, and processes the message as indicated by block 18 in FIG. 2B. Typically, the DCE 7 is a modem which demodulates the incoming signal and converts the signal into a digital signal which is provided to the DTE 8. The DCE 7 may also perform other types of processing, such as stripping off transport layer framing. The DTE 8 then analyses the polling message and determines whether the DTE 8 has any actual data to send to the control device 1, as indicated by block 19 in FIG. 2B. As stated above, if the DTE 8 has real data to send, the DTE 8 will begin responding to the polling message as quickly as possible so that the no-data silent timing interval may be set to a very short duration. If the DTE 8 has actual data to send, the data is output to the respective DCE 7 which formats the data and outputs it onto line 3, as indicated by block 20 in FIG. 2B.

If the DTE 8 determines that it has no actual data to send to the control device 1, the DCE 7 outputs nothing onto line 3 (i.e., the DCE 7 simply does not turn on carrier). The control device 1 measures the silence interval, which begins at the end of the transmission of its own poll message, to determine whether the silence interval exceeds a predetermined threshold interval, as indicated by blocks 13 and 14 in FIG. 2A. If the DTE 8 sends a message to control device 1, the control device 1 simply receives the data, demodulates it and processes it in the same manner in which typical multipoint polling protocols process actual data, as indicated by block 15 in FIG. 2A. If the silence interval exceeds the predetermined threshold interval, the control device 1 determines that the DTE 8 has no data to send and, therefore, sends the next message, which may or may not be a polling message, as indicated by block 16.

FIGS. 3, 5, 7 and 9 are timing diagrams demonstrating the relative timing aspects of the multipoint polling protocol of the present invention employing the logic illustrated by the flow charts of FIGS. 2A and 2B, 4A and 4B, 6, and 8, respectively. The horizontal axis labeled "t" in FIGS. 3, 5, 7 and 9 indicates increasing time in the direction of the arrow. For ease of illustration, the timing diagrams show the times during which silence is present on the line 3 as shaded boxes. It should be noted that the actual waveforms transmitted on the line 3 may be digital or analog. It should also be noted that the relative durations of the polling messages, the silent delay interval created by the control device 1, the no-data silent interval and the actual data, with respect to one another, are not necessarily accurately depicted in the timing diagrams of FIGS. 3, 5, 7 and 9. Rather, the timing diagrams are merely intended to demonstrate the concepts of the multipoint polling protocol of the present invention.

Figure 3:
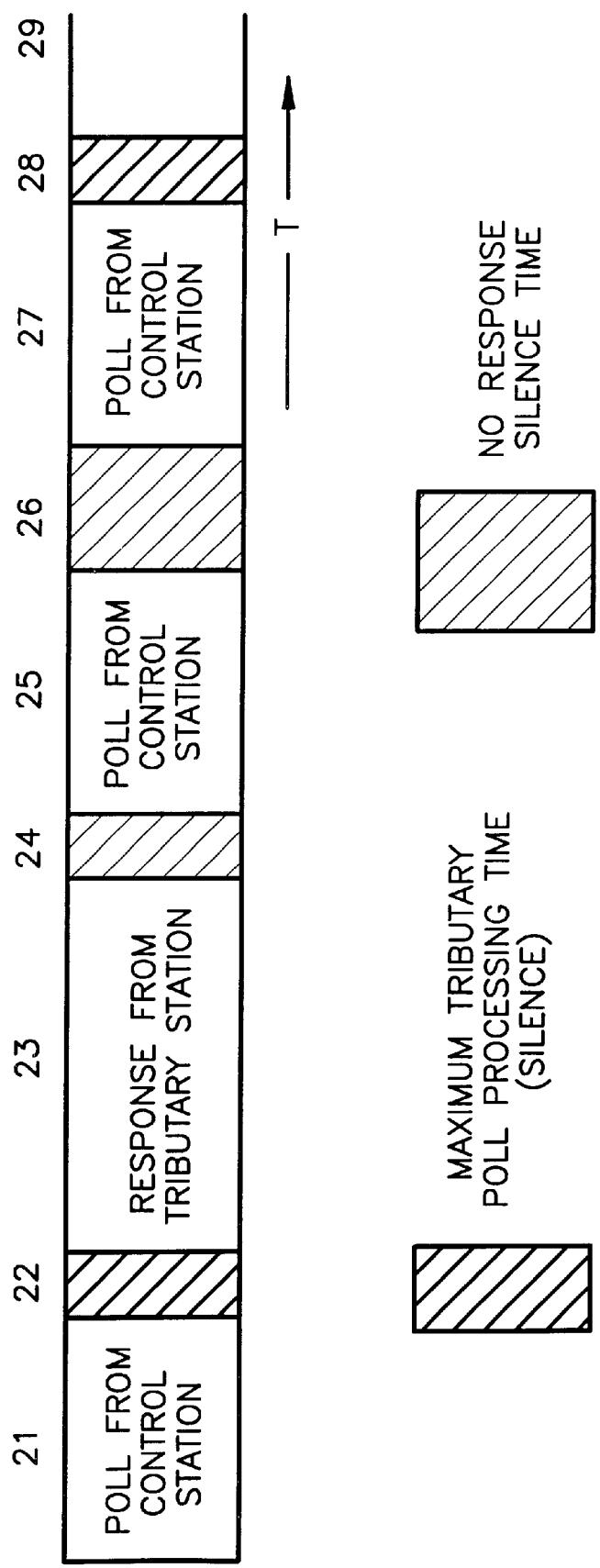
FIG. 3 is a timing diagram demonstrating an example of a typical protocol sequence of the present invention employing the logic illustrated by the flow chart of FIG. 2.

FIG. 3 is a timing diagram which provides an exemplary demonstration of the timing aspects of the embodiment of the multipoint polling protocol of the present invention illustrated in FIGS. 2A and 2B. In the example shown in FIG. 3, a polling message 21 is issued by the control device 1. The polling message 21 is then followed by the maximum poll response delay 22 which is followed by a poll response 23 sent by the polled DTE 8. Following response 23, control device 1 imposes a brief silence interval 24 before beginning to transmit another poll message 25. This silence interval is used for other aspects of this multipoint polling protocol which are discussed later. The polling message 25 is then followed by the no-data silent interval 26, indicating that the DTE 8 which received the polling message had no real data to send to the control device 1. The control device 1 responds to silence interval 26 by sending polling message 27 which is addressed to a different DTE 8. Polling message 27 is followed by a transmission of data 29 from the polled DTE 8 to the control device 1 after a brief silence interval 28 which is less than or equal to the maximum poll response delay. Alternatively, the polled DTE 8 could respond with silence if it has no data to send.

The no-data silent interval is illustrated in the timing diagrams of FIGS. 3, 5, 7 and 9 as being of shorter duration than the interval required for sending data or a polling message. This is intended to demonstrate that the no-data silent interval can be extremely short in duration, thereby minimizing the amount of bandwidth needed for poll responses. The ability to use a very short silent poll response is one of the important advantages of the multpoint polling protocol of the present invention. However, it should be noted that it is not necessary for the no-data silent threshold interval to be shorter than the intervals required for sending a polling message and/or data.

It is, of course, possible that the reason the control device 1 receives silence in response to a poll message sent to a DTE 8 is that the DTE 8 or associated DCE 7 is, for some reason, unable to respond. For example, the DTE 8 may have been taken off line or had its power turned off or the DCE 7 may have lost synchronization with the signals sent by the control device 1 and may require that the control device 1 send special signals to regain synchronization. In the first case, the DTE 8 should no longer be polled or should be polled at a much lower rate. The second case requires that the control device 1 send special signaling sequences. It is therefore necessary for the control device 1 to be able to distinguish between the case where a DTE 8 does not respond because it has no data to send and the case where it is unable to respond. This can easily be accomplished through the use of a special polling message which requires that the DTE 8 respond regardless of whether or not it has data to send.

In accordance with this embodiment, after receiving a predetermined number of silent responses in response to a predetermined number of sequential polls sent to a particular DTE 8, the control device 1 sends a "mandatory-response" poll. Upon receiving this message, the DTE 8 either sends a normal data message, if it has data to send, or it sends a non-silent "no-data" message which can be the type of non-silent "no-data" response commonly used by protocols used on typical polled multipoint circuits. If the control device 1 receives no response to this poll, it treats this as an indication that the DTE and/or DCE is unable to respond and, therefore, takes appropriate action. Because the mandatory-response poll is sent infrequently, the infrequent transmission of no-data responses by tributary stations only causes a negligible loss in bandwidth efficiency.

Figure 4:
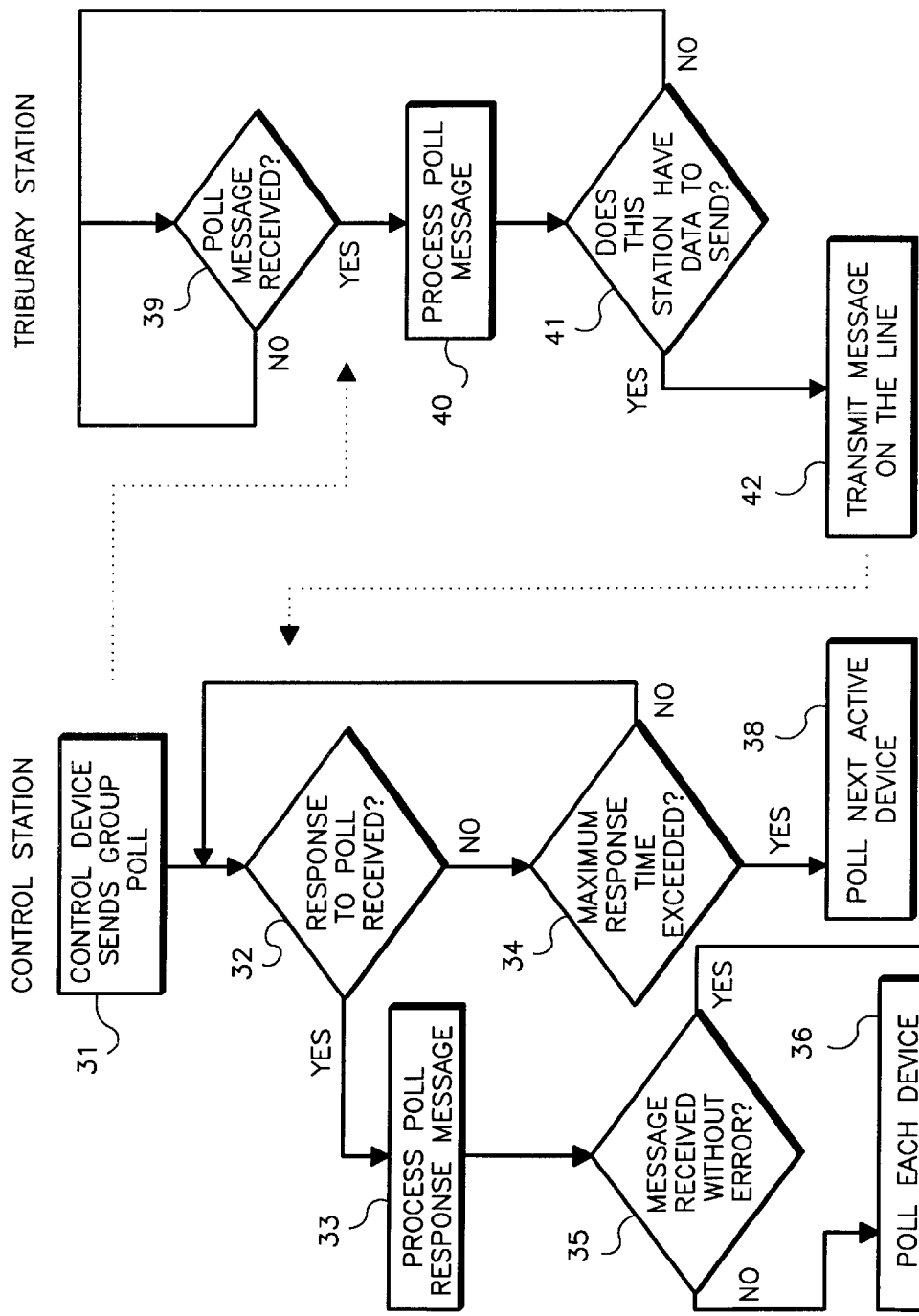
FIGS. 4A and 4B are flow charts illustrating the multipoint protocol of the present invention wherein a single poll is issued to a group of inactive stations.

FIGS. 4A and 4B are flow charts illustrating the multi-point protocol of the present invention wherein a single poll is issued to a group of DTE devices. In accordance with the present invention, it has been determined that this is an efficient way of polling when there are a number of DTE devices 8 which are presently inactive meaning that they temporarily do not require the use of the communications line. This may happen if, for example, the users of the DTE 8 devices are currently out of the office or are not using the DTE 8 for some extended time period for some other reason.

The control device first sends the group poll to some number of the DTEs 8, as indicated by block 31 in FIG. 4A. The group poll can be a message which uses a broadcast address so that all DTE devices 8 will inspect its contents. The contents of the message in this case are a list of all DTE devices 8 which are being polled as a group. A DTE 8 which has data to send can immediately respond to this poll. The DTEs 8 receive the polling message, as indicated by block 39 in FIG. 4B, and process the polling message in the manner discussed above, as indicated by block 40 in FIG. 4B. The DTEs 8 then determine whether they have any real data to send to the control device 1, as indicated by block 41 in FIG. 4B and, if so, their associated DECs 7 output the data onto the line 3, as indicated by block 42. If none of the DTEs 8 have any real data to send to the control device 2, the DCEs 7 output nothing onto the line 3 and wait for the next poll message. The control device 1 then waits for a response and simultaneously determines whether the silence interval on line 3 exceeds the no-data silent threshold interval, as indicated by blocks 32 and 34 in FIG. 4A. If a message is received before the threshold interval is exceeded, the control device 1 receives the actual data being sent by the DCE 7, and demodulates the data in the manner discussed above, provided that only one of the DCEs 7 responded with actual data. This is illustrated by blocks 33, 35 and 37 in FIG. 4A. After this, control device 1 can poll an active device individually since none of the other devices which were addressed by the group poll has data to send.

If at block 34 in FIG. 4A a determination is made that the silence interval exceeds the threshold interval, the control device 1 determines that the DTEs 8 which have been polled as a group have no data to send and then sends the next message, which may or may not be a polling message, as indicated by block 38 in FIG. 4A. Therefore, if none of the DTEs 8 have data to send, all respond simultaneously with silence.

Although it is unlikely, it is possible that more than one of the DTEs 8 addressed by the group poll will have data to send. In this case, more than one of the DCEs 7 will output data onto line 3 at the same time, thereby causing all of the data to be corrupted. The control device 1 will not be able to demodulate any of this data. If the control device 1 determines that the data received is corrupted (such as through a checksum or cyclic redundancy check as is commonly used in communications protocols), as indicated by block 35, the control device 1 will then send individual polls to each of the devices which received the group poll, as indicated by block 36. The process will then return to block 12 in FIG. 2A. The protocol will then operate in essentially the same manner as that discussed above with respect to blocks 12 through 20 of FIG. 2A.

The low-activity data terminal devices generally should be polled infrequently to maximize the use of bandwidth for the higher-activity devices, which must be polled frequently due to the fact that they frequently have data to send to the control device 1. Therefore, once the first group polling message has been responded to, the response preferably will be followed by a series of polling messages to individual higher-activity devices and polling responses, such as the sequence depicted in FIG. 3. In accordance with the preferred embodiment, a high-activity sequence, such as that depicted in FIGS. 2A and 2B, will occasionally be replaced with a low-activity sequence, such as that depicted in FIGS. 4A and 4B, to allow the low-activity devices to be polled and to send data to the control device 1.

Figure 5:
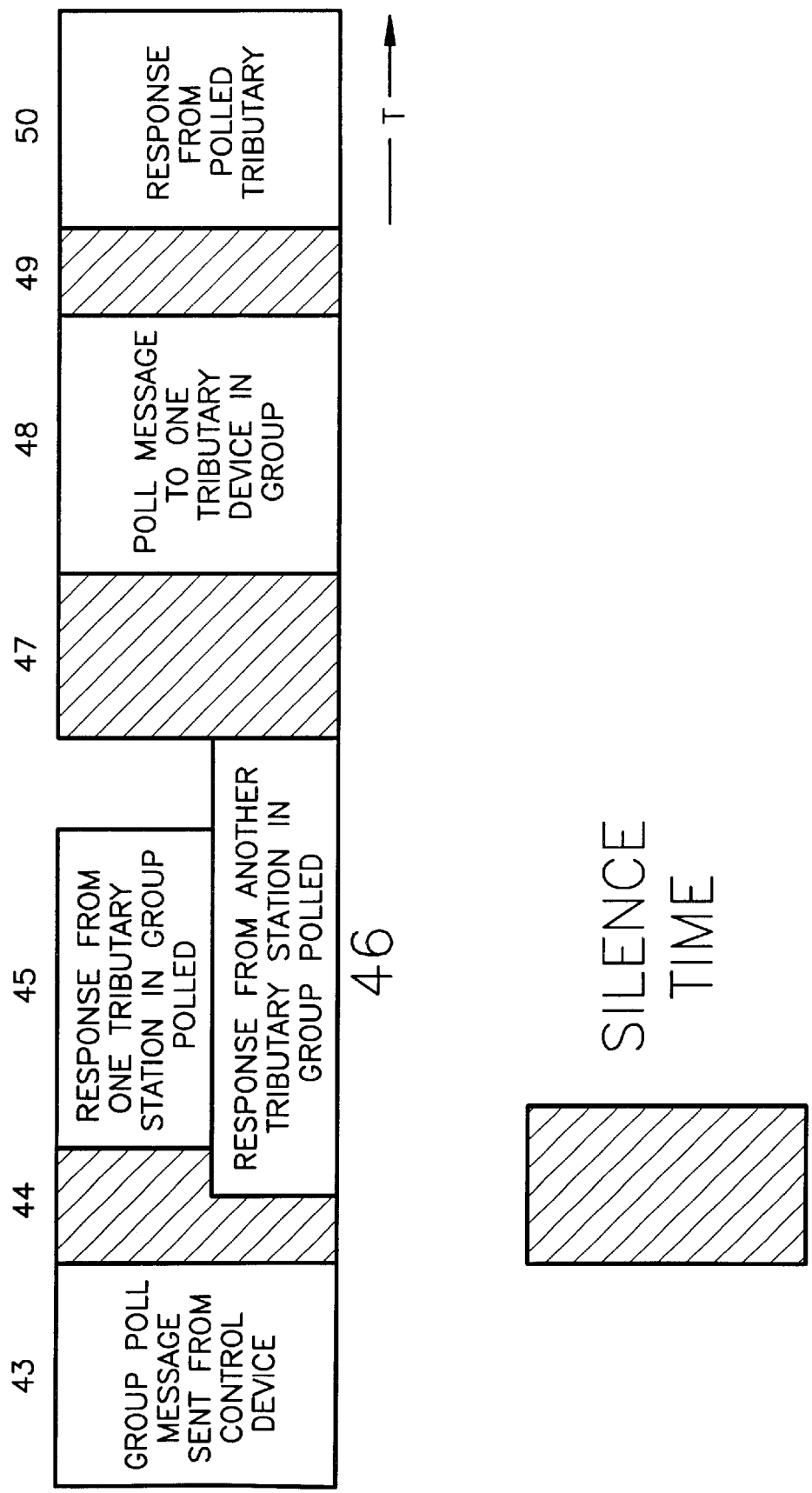
FIG. 5 is a timing diagram demonstrating an example of a typical protocol sequence of the present invention employing the logic illustrated by the flow charts of FIGS. 4A and 4B.

FIG. 5 is a timing diagram illustrating the multipoint polling protocol of the present invention in accordance with the embodiment shown in FIGS. 4A and 4B wherein a group polling message is issued by the control device 1 to a plurality of terminal devices. The group poll 43 is sent by control device 1 to a plurality of terminal devices. In the sequence illustrated in FIG. 5, two devices which received the group poll have data to send and both respond approximately simultaneously after a brief silence interval 44, as indicated by blocks 45 and 46. As a result of the simultaneous transmission, control device 1 determines that it has received a corrupted response and proceeds to poll each device in the group individually. FIG. 5 shows this as a poll in block 48 followed by a response from the first device polled in block 50. As described previously, any of the devices in the group can respond with silence to individual polls if they have no data to send. As an alternative to individually polling all members of the group, control device 1 may, at some convenient point, issue a group poll message to a smaller group which is a subset of the original group polled. The control device may then continue to modify the group or groups polled based on the responses received until all devices requiring use of the line have had a chance to transmit.

Figure 6:
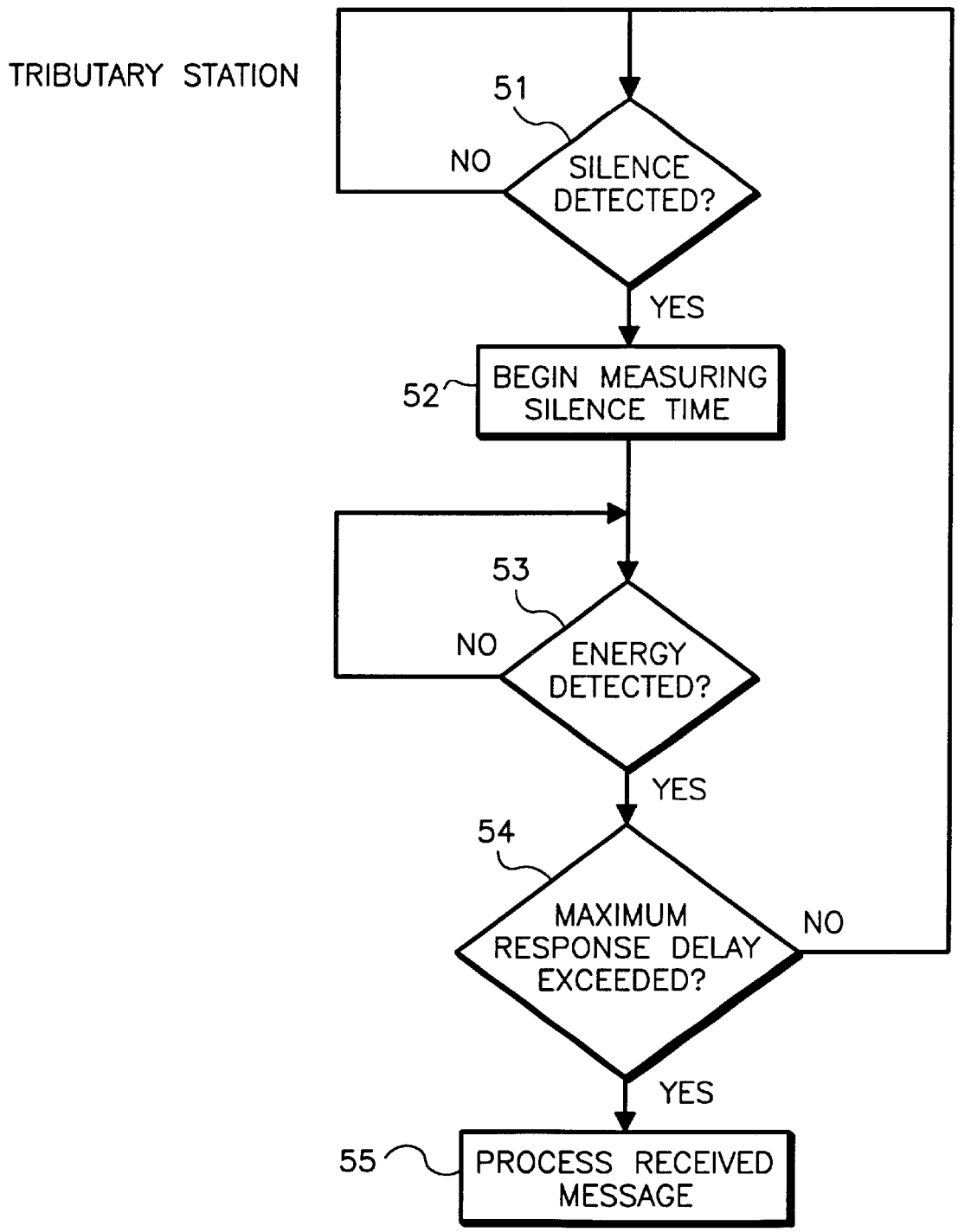
FIG. 6 is a flow chart illustrating the multipoint protocol of the present invention wherein a tributary station determines if the next transmissions will be sent from the control station or from another tributary station.

FIG. 6 is a flow chart illustrating the process used by a DCE 7 to determine whether or not the transmission currently on the line 3 is being sent by the control device 1 or by another DCE 7. When silence is detected following transmission by any other DCE device 7 or by the control device 1, the DCE device 7 begins measuring the length of the silence interval. This is indicated by blocks 51 and 52. When the end of the silence period is detected in block 53, the measured length of the silence period is compared to the maximum time allowed for DTE devices 8 to respond to a poll. If the silence time does not exceed this time, as determined at block 54, the transmission is from another DCE device and can be disregarded by this station. This is shown by the return path to block 51. Otherwise, if the silence does exceed this time, the transmission is from the control device 1 and the DCE proceeds to process this message in the manner discussed above, as indicated by block 55.

Figure 7:
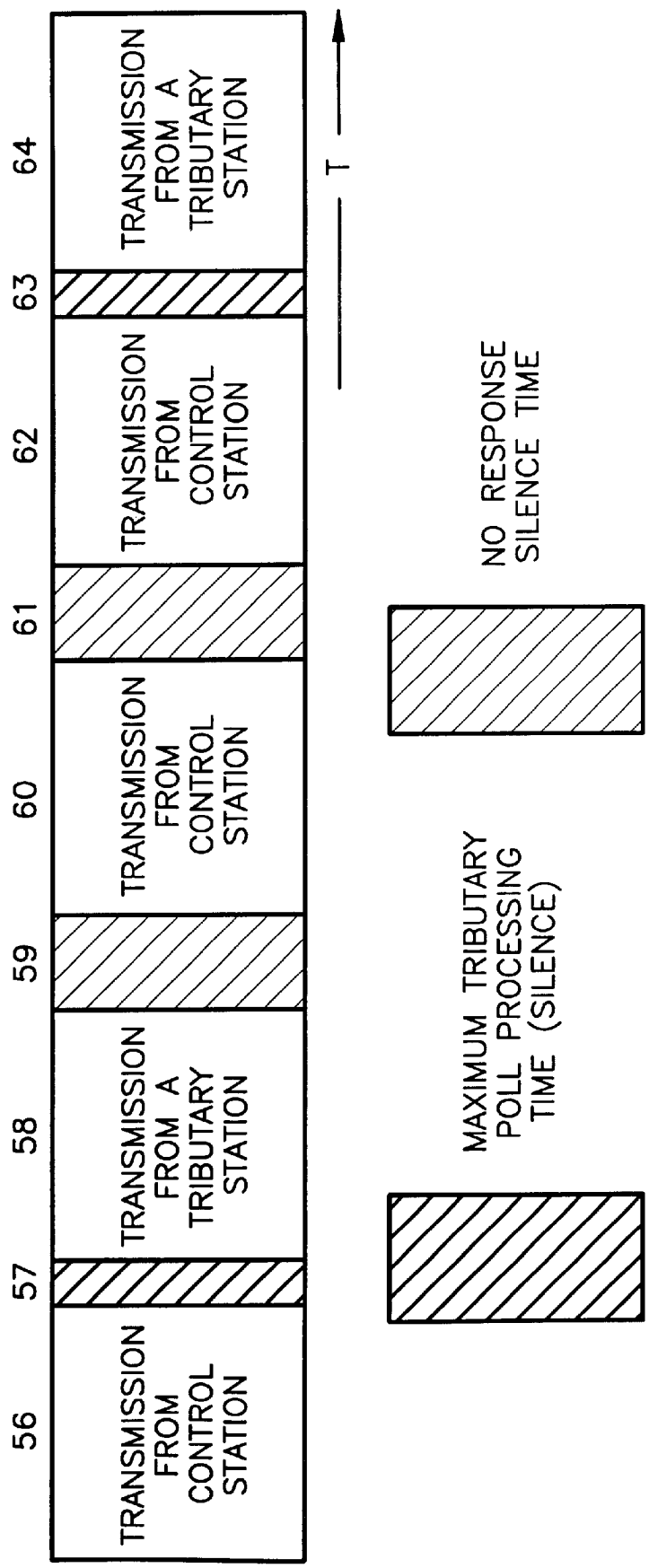
FIG. 7 is a timing diagram demonstrating an example of a typical protocol sequence of the present invention employing the logic illustrated by the flow chart of FIG. 6.

FIG. 7 is a timing diagram illustrating a possible sequence of silence intervals which may be observed by a DCE device 7 monitoring the signal on the subscriber line 3. Transmission 56 from control device 1 is followed by silence interval 57, which is less than the maximum tributary poll response time. The DCE device 7 determines that transmissions 58 and 64 are from another DCE device based on the lengths of silence intervals 57 and 63. Likewise, the DCE device 7 determines that transmissions 60 and 62 are from control device 1 based on the lengths of silence intervals 59 and 61.

Figure 8:
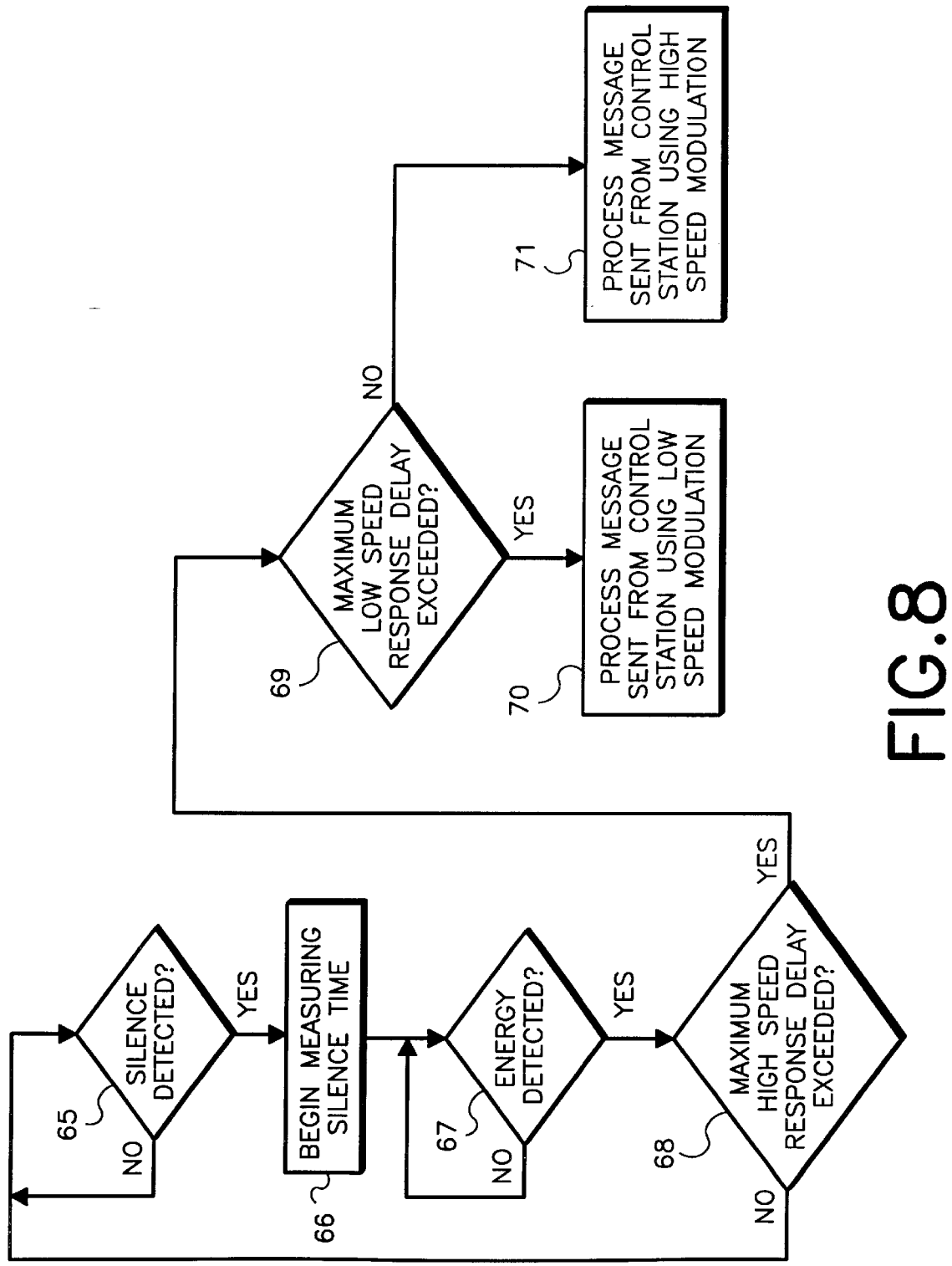
FIG. 8 is a flow chart illustrating the multipoint protocol of the present invention wherein devices using a high-speed modulation share the line with devices using a low-speed modulation.

FIG. 8 is a flow chart functionally illustrating an embodiment of the present invention wherein the polling protocol illustrated in FIGS. 2A and 2B are used on line 3 to which a plurality of DCE devices 7 are connected, each of which uses one of two different modulations, either a high-speed modulation or a low-speed modulation. In accordance with this embodiment, the control device 1 waits for a predetermined threshold interval of silence to elapse after the end of the last transmission on the line 3 before issuing a poll to a low-speed device. This threshold interval is longer than the no-data silent threshold interval. The tributary devices measure the length of the silence interval and determine that it is long enough so as to indicate that the next transmission is from the control device, as shown in blocks 65, 66, 67 and 68 in FIG. 8. When the low-speed devices detect this longer threshold interval of silence, as indicated by blocks 69 and 70 in FIG. 8, they prepare to receive a message sent from the control device 1 using the low-speed modulation. When this silence interval does not exceed the longer threshold interval, as indicated by blocks 69 and 71 in FIG. 8, the low-speed devices know that they will not be able to demodulate the high-speed transmission and, therefore, disable their receivers until energy is no longer detected on the line. The receivers are disabled until a silence time is detected which exceeds the no-response silence time. This indicates when the control station will next transmit again. The logic used to make this determination is the same as that discussed previously in relation to FIG. 6.

Likewise, using the same technique, when high-speed devices recognize that the next transmission will use the high-speed modulation, they prepare to receive a message sent from control device 1 using the high-speed modulation. When the silence interval indicates that the low-speed modulation will be used, the high-speed devices disable their receivers until a silence time is detected which has a duration which exceeds the no response silence time. It may be that, due to time resolution ability of the low-speed modulation, the no-response silence interval as to be longer when a low-speed device is polled. If so, this can easily be accomodated since all devices (high-speed and low-speed) know that a low-speed device is responding.

Figure 9:
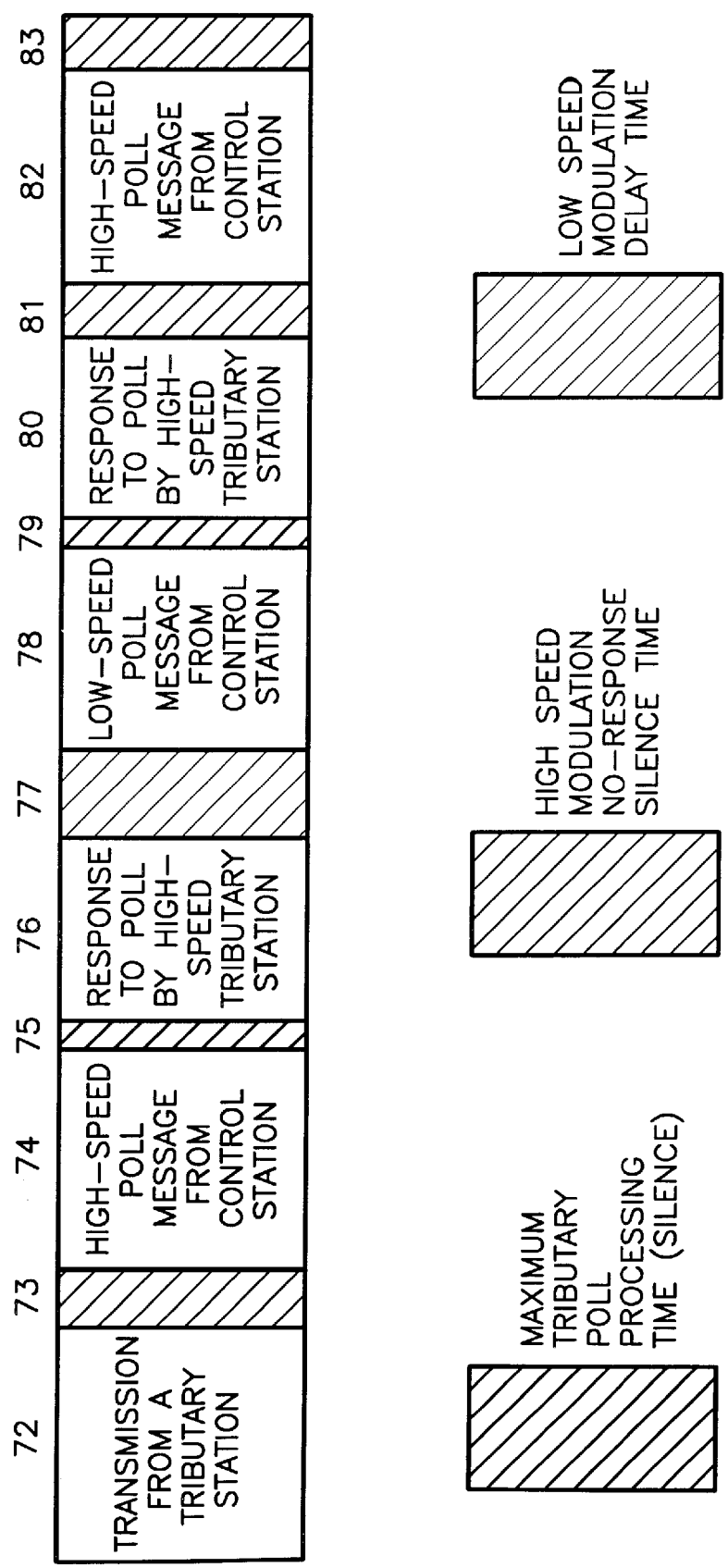
FIG. 9 is a timing diagram demonstrating a typical protocol sequence of the present invention employing the logic illustrated by the flow chart of FIG. 8.

FIG. 9 is a timing diagram illustrating the multipoint polling protocol of the present invention in accordance with the embodiment shown in FIG. 8 wherein devices using two different modulations share the same subscriber line. In FIG. 9, after a transmission 72 sent from a tributary station is received by the control device 1, the control device 1 waits for the no-response silence time 73 before sending poll 74 using the high speed modulation. The polled DCE 7 responds with transmission 76 following a brief silence interval 75 which is less than the maximum tributary poll response time, as shown. Following this, control device 1 first waits for silence interval 77, which exceeds the low speed modulation delay, and then sends poll message 78 using the low-speed modulation. The DCE device 7 polled by low-speed message 78 responds after a brief delay 79, which may be longer than the high-speed modulation brief silence interval 75, with transmission 80. Following this, control device 1 prepares to send poll message 82 using the high-speed modulation by first waiting for silence interval 81 which is less than the low-speed modulation delay time 77, as shown. The control device 1 then waits for the no-response silence time 83 before sending the next poll.

It should be noted that the present invention has been described above with respect to particular embodiments and that the present invention is not limited to these embodiments. It will be understood by those skilled in the art that modifications may be made to the embodiments discussed above without deviating from the spirit and scope of the present invention. It should be noted that the multipoint polling protocol of the present invention is not limited with respect to the types of equipment used to implement the protocol of the present invention, provided that the equipment is capable of carrying out the protocol of the present invention. It should also be noted that the present invention is not limited with respect to the line coding techniques used for communicating information between the control device 1 and the DCEs 7. It should also be noted that the present invention is not limited with respect to the type of network in which the protocol of the present invention is implemented. It should also be noted that while the DCEs 7 and DTEs 8 have described as being implemented separately from one another, it will be apparent to those skilled in the art that a DTE 8 and its respective DCE 7 may also be integrated into a single terminal device which performs all of the tasks of the DCE 7 and the DTE 8.

What is claimed is:

1. An apparatus for performing a multipoint polling protocol, the apparatus being in communication with a bandwidth-management control device, the bandwidth management control device controlling transmission of information on a communications line, the control device being coupled to the communications line at a first end of the communications line, the control device being capable of modulating information onto the communications line, the control device being capable of demodulating information received via the communications line, the apparatus comprising:

a first active tributary station coupled to a second end of the communications line, the first active tributary station being capable of demodulating information transmitted over the communications line from the control device and being capable of responding to polling messages sent to the first active tributary station from the control device, the first active tributary station being capable of modulating information onto the communications line to be sent to the control device, wherein if the first active tributary station has data to send to the control device, the first active tributary station responds to a first polling message sent by the control device to the first active tributary station by sending data to the control device, wherein when the first active tributary station has no data to send to the control device, the first active tributary station responds to the first polling message by outputting nothing onto the communications line such that a first interval of silence occurs on the communications line, the control device measuring the silence interval, the control device determining that the first tributary station has no data to send to the control device when the silence interval exceeds a first predetermined threshold interval.

2. The apparatus of claim 1 further comprising:

a second tributary station coupled to the second end of the communications line, the second tributary station being capable of demodulating information transmitted over the communications line from the control device, the second tributary station being capable of modulating information onto the communications line to be sent to the control device, wherein when the second tributary station receives a second polling message sent over the communications line by the control device, the second tributary station processes the second polling message, wherein if the second tributary station has data to send to the control device, the second tributary station responds to the polling message by sending data to the control device, wherein if the second tributary station has no data to send to the control device, the second tributary station responds to the polling message by outputting nothing onto the communications line such that a second interval of silence occurs on the communications line, the control device measuring the second silence interval, the control device determining that the second tributary station has no data to send to the control device when the second silence interval exceeds the first predetermined threshold interval.

3. The apparatus of claim 2, wherein the second polling message is sent to the second tributary station by the control device after the first tributary station has responded to the first polling message.

4. The apparatus of claim 2, wherein the first and second polling messages are sent simultaneously by the control device as a group polling message, and wherein if neither the first tributary station nor the second tributary station has data to send to the central office, the first and second silence intervals occur simultaneously such that the first tributary station and the second tributary station respond to the first and second polling messages simultaneously with silence.

5. An apparatus for performing a multipoint polling protocol, the apparatus being in communication with a bandwidth-management control device, the bandwidth management control device controlling transmission of information on a communications line, the control device being coupled to the communications line at a first end of the communications line, the control device being capable of transmitting high-speed and low-speed transmissions over the communications line, the control device capable of demodulating high-speed transmissions received via the communications line, the apparatus comprising:

a first active tributary station coupled to a second end of the communications line via a shared multipoint circuit, the first active tributary station being capable of demodulating high-speed and low-speed transmissions sent over the communications line from the control device;

a second active tributary station coupled to a second end of the communications line via the shared multipoint circuit, the second active tributary station being capable of demodulating low-speed transmissions sent over the communications line from the control device, wherein prior to the control device transmitting a low-speed transmission over the communications line to the tributary stations, the control device conveys an indication to the tributary stations that a low-speed transmission is going to be sent to the tributary stations, wherein the second tributary station detects the indication and prepares to demodulate a low-speed transmission, the indication corresponding to a silence interval, the second tributary station measuring the silence interval to detect the indication.

6. The apparatus of claim 5, wherein the indication is also detected by the first tributary station, wherein when the silence interval exceeds a predetermined duration, the second tributary station prepares to demodulate a low-speed transmission sent from the control device and the first tributary station disables a receiver of the first tributary station so that the first tributary station does not attempt to demodulate the low-speed transmission, wherein when the silence interval does not exceed the predetermined duration, the first tributary station prepares to demodulate a high-speed transmission sent from the control device and the second tributary station disables a receiver of the second tributary station so that the second tributary station does not attempt to demodulate the high-speed transmission.

7. An apparatus for performing a multipoint protocol, the apparatus being in communication with a bandwidth-management control device, the bandwidth management control device controlling transmission of information on a communications line, the control device being coupled to the communications line at a first end of the communications line, the apparatus comprising:

a first active tributary station coupled to the communications line; and a second active tributary station coupled to the communications line, the first active tributary station receiving the signal transmitted over the communications line from the second active tributary station, the second active tributary station receiving the signal transmitted over the communications line from the first active tributary station, the first and second active tributary stations receiving the signal transmitted over the communications line from the control device, the first active tributary station being capable of determining whether a current transmission of information over the communications line is from the control device or from the second active tributary station based on a first interval of silence occurring on the communications line after a most recent transmission of information over the communications line, the second active tributary station being capable of determining whether the current transmission of information over the communications line is from the control device or from the first active tributary station based on the first interval of silence, wherein the first and second active tributary stations only demodulate information transmitted over the communications line from the control device, wherein if the first interval of silence has a duration which is greater than a predetermined threshold interval, the first and second active tributary stations determine that the current transmission is from the control device and demodulate the current transmission, wherein if the first interval of silence has a duration which is less than the predetermined threshold interval, each tributary station determines that the current transmission is from the other tributary station and therefore does not demodulate the current transmission.

8. The apparatus of claim 7, wherein the first and second tributary stations are connected to the communications line via a shared bus.

9. The apparatus of claim 8, wherein the current transmission is a polling message and wherein each of the tributary stations demodulate the polling message and process the polling message to determine which tributary station the polling message is intended for, wherein if the first tributary station determines that the polling message was intended for the first tributary station, the first tributary station determines whether it has data to send to the control device, wherein if the first tributary station has no data to send to the control device, the first tributary station outputs nothing onto the communications line such that a second interval of silence occurs, the second interval of silence having a duration which is shorter than the duration of the first silence interval, wherein if the first tributary station has data to send to the control device, the first tributary station begins transmitting the data to the control device over the communications line, wherein a third interval of silence occurs on the communications line between the time that the first tributary station receives the polling message and the time at which the first tributary station begins transmitting the data to the control device, the third interval of silence having a duration which is shorter than the duration of the second interval of silence.

10. An apparatus for performing a multipoint polling protocol comprising:

a first means for controlling transmission of information on a communications line, the first means being coupled to the communications line at a first end of the communications line; and a second means coupled to a second end of the communications line for demodulating information transmitted over the communications line from the first means and for modulating information onto the communications line to be sent to the first means, wherein when the second means receives a first polling message sent over the communications line by the first means, the second means determines whether it has any data to send to the first means, wherein if the second means has data to send to the first means, the second means responds to the polling message by modulating the data to be sent onto the communications line, wherein when the second means is active, but determines that it has no data to send to the first means, the second means responds by outputting nothing onto the communications line such that a first interval of silence occurs on the communications line, the first means measuring the silence interval, and wherein when the silence interval exceeds a first predetermined threshold interval, the first means determines that the second means has no data to send to the first means.

11. The apparatus of claim 10, wherein the apparatus comprises at least a third means coupled to the second end of the communications line for demodulating information transmitted over the communications line from the first means and for modulating information onto the communications line to be sent to the first means, wherein when the third means receives a second polling message sent over the communications line by the first means, the third means determines whether it has any data to send to the first means, wherein if the third means has data to send to the first means, the third means responds to the second polling message by modulating the data to be sent by the third means to the first means onto the communications line, wherein when the third means determines that it has no data to send to the first means, the third means responds by outputting nothing onto the communications line such that a second interval of silence occurs on the communications line, the first means measuring the second silence interval, and wherein when the second silence interval exceeds the predetermined threshold interval, the first means determines that the third means has no data to send to the first means.

12. The apparatus of claim 11, wherein the second polling message is sent to the third means by the first means after the second means has responded to the first polling message.

13. The apparatus of claim 11, wherein the first and second polling messages are sent simultaneously by the first means as a group polling message, and wherein if neither the second or third means has data to send to the first means, the first and second silence intervals occur simultaneously such that the second and third means respond to the first and second polling messages simultaneously with silence.

14. A method of performing a multipoint polling protocol comprising the steps of:

receiving a first polling message at a first active tributary station, the first active tributary device being capable of responding to polling messages, the first polling message being sent from a bandwidth-management control device to the first active tributary station;

determining whether the first active tributary station has any data to send to the control device;

if it is determined that the first active tributary station has data to send to the control device, responding to the first polling message by modulating the data to be sent to the control device onto the communications line; and if it is determined that the first active tributary station has no data to send to the control device, responding to the first polling message by outputting nothing onto the communications line such that a first interval of silence occurs on the communications line.

15. The method of claim 14, further comprising the steps of:

receiving a second polling message at a second active tributary station, the second polling message being sent from the control device to the second tributary station, the second active tributary station being capable of responding to polling messages;

determining, at the second active tributary station, whether the second active tributary station has any data to send to the control device;

if it is determined that the second active tributary station has data to send to the control device, responding to the second polling message at the second active tributary station by modulating the data to be sent to the control device from the second active tributary station onto the communications line; and if it is determined that the second active tributary station has no data to send to the control device, responding to the second polling message at the second active tributary station by outputting nothing onto the communications line such that a second interval of silence occurs on the communications line.

16. The method of claim 15, wherein the second polling message is sent to the second tributary station after the first tributary station has responded to the first polling message.

17. The method of claim 15, wherein the first and second polling messages are sent simultaneously as a group polling message, and wherein if neither the first or second tributary stations has data to send to the control device, the first and second silence intervals occur simultaneously such that the first and second tributary stations respond to the first and second polling messages simultaneously with silence.

18. A method for performing a multipoint polling protocol comprising the steps of:

conveying an indication to first and second active tributary stations as to whether a high-speed or low-speed transmission is going to be sent from a bandwidth-management control device over a communications line to the first and second active tributary stations, the indication being conveyed by the control device, the indication corresponding to a silence interval, the control device being coupled to the communications line at a first end of the communications line, the control device capable of transmitting high-speed and low-speed transmissions over the communications line, the first and second active tributary stations being coupled to a second end of the communications line via a shared multipoint circuit, the first active tributary station being capable of demodulating high-speed transmissions, the second active tributary station being capable of demodulating low-speed transmissions; and detecting the indication at the second active tributary station by measuring the silence interval, wherein when the second active tributary station detects the indication, the second active tributary station prepares to demodulate a low-speed transmission from the control device.

19. The method of claim 18, wherein the indication is also detected by the first active tributary station, wherein when the silence interval exceeds a predetermined duration, the second active tributary station prepares to demodulate a low-speed transmission sent from the control device and the first active tributary station disables a receiver of the first active tributary station so that the first active tributary station is no longer active and does not attempt to demodulate the low-speed transmission, wherein when the silence interval does not exceed the predetermined duration, the first active tributary station prepares to receive a high-speed transmission from the control device and the second active tributary station disables a receiver of the second active tributary station so that the second active tributary station is no longer active and does not attempt to demodulate the high-speed transmission.

20. A method for performing a multipoint protocol comprising the steps of:

receiving a message transmitted over a communications line at a first active tributary station, the first active tributary station being coupled to the communications line via a shared bus;

receiving a message transmitted over the communications line at a second active tributary station, the second active tributary station being coupled to the communications line via the shared bus;

determining, at the first active tributary station, whether the message is from a bandwidth management control device or from the second active tributary station based on a first interval of silence occurring on the communications line after a previous transmission of a message over the communications line; and determining, at the second active tributary station, whether the message is from the bandwidth management control device or from the first active tributary station based on the first interval of silence, wherein if the first interval of silence has a duration which is greater than a predetermined threshold interval, the first and second active tributary stations demodulate the message, wherein if the first interval of silence has a duration which is less than the predetermined threshold interval, each active tributary station determines that the message is from the other active tributary station and therefore does not demodulate the message.

21. The method of claim 20, wherein the message is a polling message sent from the control device and wherein each of the tributary stations demodulate the polling message and process the polling message to determine which tributary station the polling message is intended for, wherein if the first tributary station determines that the polling message is intended for the first tributary station, the first tributary station determines whether it has data to send to the control device, wherein if the first tributary station has no data to send to the control device, the first tributary station outputs nothing onto the communications line such that a second interval of silence occurs on the communications line, the second interval of silence having a duration which is shorter than the duration of the first silence interval, wherein if the first tributary station has data to send to the control device, the first tributary station begins transmitting the data to the control device over the communications line, wherein a third interval of silence occurs on the communications line between the time at which the first tributary station receives the polling message and the time at which the first tributary station begins transmitting the data to the control device, the third interval of silence having a duration which is shorter than the duration of the second interval of silence.

22. An apparatus for performing a multipoint polling protocol comprising:
a bandwidth-management control device controlling transmission of information on a communications line, the control device being coupled to the communications line at a first end of the communications line, the control device being capable of modulating information onto the communications line, the control device being capable of demodulating information received via the communications line, the control device polling a first active tributary station by sending a first polling message to the first active tributary station, the first active tributary station being capable of responding to the first polling message, wherein if the first active tributary station has data to send to the control device, the first active tributary station responds to the polling message by sending data to the control device, wherein when the first active tributary station has no data to send to the control device, the first active tributary station responds to the polling message by outputting nothing onto the communications line such that a first interval of silence occurs on the communications line, the control device measuring the silence interval, the control device determining that the first active tributary station has no data to send to the control device when the silence interval exceeds a first predetermined threshold interval.

23. The apparatus of claim 22, wherein the control device sends a second polling message to a second active tributary station coupled to the second end of the communications line, the second active tributary station being capable of demodulating information transmitted over the communications line from the control device, the second active tributary station being capable of modulating information onto the communications line to be sent to the control device, wherein when the second active tributary station receives a second polling message sent over the communications line by the control device, the second active tributary station processes the second polling message, wherein if the second active tributary station has data to send to the control device, the second active tributary station responds to the polling message by sending data to the control device, wherein if the second active tributary station has no data to send to the control device, the second active tributary station responds to the polling message by outputting nothing onto the communications line such that a second interval of silence occurs on the communications line, the control device measuring the second silence interval, the control device determining that the second active tributary station has no data to send to the control device when the second silence interval exceeds the first predetermined threshold interval.

24. The apparatus of claim 23, wherein the second polling message is sent to the second active tributary station by the control device after the first active tributary station has responded to the first polling message.

25. The apparatus of claim 23, wherein the first and second polling messages are sent simultaneously by the control device as a group polling message, and wherein if neither the first active tributary station nor the second active tributary station has data to send to the control device, the first and second silence intervals occur simultaneously such that the first active tributary station and the second active tributary station respond to the first and second polling messages simultaneously with silence.

26. An apparatus for performing a multipoint polling protocol comprising:
a bandwidth-management control device controlling transmission of information on a communications line, the control device being coupled to the communications line at a first end of the communications line, the control device capable of transmitting high-speed and low-speed transmissions over the communications line, the control device capable of demodulating high-speed transmissions received via the communications line, the communications line being coupled to a first active tributary station and to a second end of the communications line via a shared multipoint circuit, the first active tributary station being capable of demodulating high-speed and low-speed transmissions sent over the communications line from the control device, the second active tributary station being coupled to a second end of the communications line via the shared multipoint circuit, the second active tributary station being capable of demodulating low-speed transmissions sent over the communications line from the control device, wherein prior to the control device transmitting a low-speed transmission over the communications line to the active tributary stations, the control device conveys an indication to the active tributary stations that a low-speed transmission is going to be sent to the active tributary stations, wherein the second active tributary station detects the indication and prepares to demodulate a low-speed transmission.

27. The apparatus of claim 26, wherein the indication is also detected by the first active tributary station, the indication corresponding to a silence interval, the second active tributary station measuring the silence interval, wherein when the silence interval exceeds a predetermined duration, the second active tributary station prepares to demodulate a low-speed transmission sent from the control device and the first active tributary station disables a receiver of the first active tributary station so that the first active tributary station is inactive and does not attempt to demodulate the low-speed transmission, wherein when the silence interval does not exceed the predetermined duration, the first active tributary station prepares to demodulate a high-speed transmission sent from the control device and the second active tributary station disables a receiver of the second active tributary station so that the second active tributary station is inactive and does not attempt to demodulate the high-speed transmission.

28. A method of performing a multipoint polling protocol comprising the steps of:
sending a first polling message from a bandwidth-management control device to a first active tributary station, the first active tributary station receiving the first polling message and determining whether the first active tributary station has any data to send to the control device, wherein if it is determined that the first active tributary station has data to send to the control device, the first active tributary station responds to the first polling message by modulating the data to be sent to the control device onto the communications line, and wherein if it is determined that the first active tributary station has no data to send to the control device, the first active tributary station responds to the first polling message by outputting nothing onto the communications line such that a first interval of silence occurs on the communications line; and measuring the first silence interval at the control device and comparing the first silence interval with a first predetermined threshold interval, wherein if the first silence interval is equal to or greater than the first predetermined threshold interval, the control device determines that the first active tributary station has no data to send to the control device.

29. The method of claim 28, further comprising the steps of:

sending a second polling message from the control device to a second active tributary station, wherein when the second polling message is received at the second active tributary station, the second tributary station determines whether the second active tributary station has any data to send to the control device, wherein if the second active tributary station has data to send to the control device, the second active tributary statio[008e] responds to the second polling message by modulating the data to be sent to the control device from the second active tributary station onto the communications line, and wherein if the second active tributary station has no data to send to the control device, the second active tributary station responds to the second polling message by outputting nothing onto the communications line such that a second interval of silence occurs on the communications line; and measuring the second silence interval at the control device and comparing the second silence interval with a second predetermined threshold interval, wherein if the second silence interval is equal to or greater than the second predetermined threshold interval, the control device determines that the second active tributary station has no data to send to the control device.

30. A method for performing a multipoint polling protocol comprising the steps of:

conveying an indication to first and second active tributary stations as to whether a high-speed or low-speed transmission is going to be sent from a bandwidth-management control device over a communications line to the first and second active tributary stations, the indication being conveyed by the control device, the indication corresponding to a silence interval, the control device being coupled to the communications line at a first end of the communications line, the control device capable of transmitting high-speed and low-speed transmissions over the communications line, the first and second active tributary stations being coupled to a second end of the communications line via a shared multipoint circuit, the first active tributary station being capable of demodulating high-speed transmissions, the second active tributary station being capable of demodulating low-speed transmissions; and detecting the indication at the second active tributary station by measuring the silence interval, wherein when the second active tributary station detects the indication, the second active tributary station prepares to demodulate a low-speed transmission from the control device.

* * * * *